United States Patent [19]
Oba

[11] Patent Number: 5,834,949
[45] Date of Patent: Nov. 10, 1998

[54] BUS DRIVER FAILURE DETECTION SYSTEM

[75] Inventor: Kaori Oba, Tokyo, Japan

[73] Assignee: NEC Corporation, Tokyo, Japan

[21] Appl. No.: 757,998

[22] Filed: Nov. 27, 1996

[30]  Foreign Application Priority Data

Dec. 8, 1995  [JP]  Japan ................................... 7-345875

[51] Int. Cl.⁶ .......................................... H03K 19/0185
[52] U.S. Cl. .................. 326/86; 226/83; 226/16
[58] Field of Search ................... 326/86, 30, 9, 326/13, 16, 14; 395/183.16, 183.06, 183.03

[56] References Cited

U.S. PATENT DOCUMENTS

| | | | |
|---|---|---|---|
| 4,748,426 | 5/1988 | Stewart | 326/30 |
| 4,849,658 | 7/1989 | Iwamura et al. | 326/30 |
| 5,039,874 | 8/1991 | Anderson | 307/270 |
| 5,285,119 | 2/1994 | Takahashi | 326/16 |
| 5,498,976 | 3/1996 | Hwang | 326/30 |

FOREIGN PATENT DOCUMENTS 5-304461  11/1993  Japan ....................................... 326/86

*Primary Examiner*—Jon Santamauro
*Assistant Examiner*—Don Phu Le
*Attorney, Agent, or Firm*—Sughrue, Mion, Zinn, Macpeak & Seas, PLLC

[57]  ABSTRACT

The invention provides a bus driver failure detection system which facilitates detection of a failure of a bus driver from which data are sent out to a bus. The bus driver failure detection system includes a plurality of bus drivers for sending out signals to a single bus, at least one receiver connected to the bus, and an impedance control circuit for controlling the bus so that, upon testing, the bus does not exhibit a high impedance state. The impedance control circuit may be constructed as a circuit which holds a value of the bus in response to a test signal.

6 Claims, 9 Drawing Sheets

BUS DRIVER FAILURE DETECTION SYSTEM

BACKGROUND OF THE INVENTION

1. Field of the Invention

This invention relates to a failure detection system for a bus driver which sends out a signal to a bus.

2. Description of the Related Art

A failure detection system for a bus driver conventionally has such a general construction as shown in FIG. 7. Referring to FIG. 7, the conventional failure detection system shown includes: a first AND circuit 121 to which a first bus driver enable signal 104, which is a control signal for enabling the output of data to a bus 101, and a timing signal 108, for controlling an output timing to the bus 101, are inputted; a first bus driver 106 for sending out a first output signal 102 to the bus 101 under the control of an output of the first AND circuit 121 inputted to a control terminal thereof; a second AND circuit 122 to which a second bus driver enable signal 105 and the timing signal 108, which controls the output timing to the bus 101, are inputted; a second bus driver 107 for sending out a second output signal 103 to the bus 101 under the control of an output of the second AND circuit 122 inputted to a control terminal thereof; and a receiver 109 for latching a value of the bus 101 under the control of the timing signal 108.

The first bus driver 106 outputs a value of the first output signal 102 to the bus 101 in synchronism with the timing signal 108 when the first bus driver enable signal 104 is selected (active). The second bus driver 107 outputs a value of the output signal 103 to the bus 101 in synchronism with the timing signal 108 when the second bus driver enable signal 105 is selected (active). The receiver 109 latches a value of the bus 101 in synchronism with the timing signal 108.

Subsequently, the conventional bus driver failure detection system will be described in more detail with reference to a circuit diagram of FIG. 8 and a time chart of FIG. 9. FIG. 8 shows an example of a detailed circuit construction of the bus driver failure detection system shown by a block diagram in FIG. 7. It is to be noted that, in FIG. 9, a waveform 108 indicates a driver enable signal, another waveform 117 indicates an output of a NAND circuit 117 of the second bus driver 107, a further waveform 111 indicates an output of a NOR 111 of the first bus driver 106, a still further waveform 101 indicates a signal potential of the bus 101, and a yet further waveform 109 indicates an output of the receiver 109.

FIG. 8 shows details of circuit constructions of the first and second bus drivers 106 and 107. The first bus driver 106 includes a NAND circuit 112 to which the output of the first AND circuit 121 and the first output signal 102 are inputted, an invertor 110 for inverting the output of the first AND circuit 121, a NOR circuit 111 to which the output signal of the invertor 110 and the first output signal 102 are inputted, and a p-channel MOS transistor 114 and an n-channel MOS transistor 113 connected in series between a power supply and the ground. The outputs of the NAND circuit 112 and the NOR circuit 111 are connected to the gates of the p-channel MOS transistor 114 and the n-channel MOS transistor 113, respectively, and a junction between the drain of the p-channel MOS transistor 114 and the drain of the n-channel MOS transistor 113 is connected to the bus 101. The second bus driver 107 includes a NAND circuit 117, an invertor 115, a NOR circuit 116, a p-channel MOS transistor 119 and an n-channel MOS transistor 118 connected in a similar manner as in the first bus driver 106, and overlapping description of the construction of the second bus driver 107 is omitted here to avoid redundancy.

For example, when the first bus driver enable signal 104 has a Low level, the output of the first AND circuit 121 exhibits a Low level. Consequently, irrespective of the logical value of the bus 101, the output of the NAND circuit 112 exhibits a High level while the output of the NOR circuit 111 exhibits a Low level, and both of the p-channel MOS transistor 114 and the n-channel MOS transistor 113 exhibit an off state (high-impedance state).

If the timing signal 108 is changed over to a High level when the first bus driver enable signal 104 exhibits a High level, then the output of the first AND circuit 121 is changed over to a High level, and if the first output signal 102 exhibits a High level, then the output of the NAND circuit 112 is changed over to a Low level and the p-channel MOS transistor 114 is put into an on state. Meanwhile, the output of the NOR circuit 111 remains at a Low level and the n-channel MOS transistor 113 remains in an off state. Consequently, "1" (=High level) is outputted to the bus 101. On the other hand, if the first output signal 102 exhibits a Low level, then the n-channel MOS transistor 113 remains at a High level and the p-channel MOS transistor 114 remains in an off state while the output of the NOR circuit 111 is changed over to a High level and the n-channel MOS transistor 113 is put into an on state. Consequently, "0" is outputted to the bus 101.

In the conventional bus construction described above, in order to detect a "0" stuck failure (stuck-at-0, called "sa0") of the gate input of the n-channel MOS transistor 113 of the output stage of the first bus driver 106, a pattern (test pattern) wherein the second output signal 103 is set to "1" and the second bus driver enable signal 105 is rendered active so that the p-channel MOS transistor 119 of the second bus driver 107 is turned on in synchronism with the timing signal 108 to output "1" to the bus 101, whereafter the first output signal 102 is set to "0" and the first bus driver enable signal 104 is rendered active so that the n-channel MOS transistor 113 of the first bus driver 106 is turned on in synchronism with the timing signal 108 to output "0" to the bus 101 must be produced.

In the pattern described above, when the n-channel MOS transistor 113 of the first bus driver 106 is normal, within a period a of FIG. 9, the n-channel MOS transistor 113 exhibits an on state and the bus 101 exhibits "0" (refer to a solid line portion of the waveform 101 of FIG. 9).

On the other hand, when the gate input of the n-channel MOS transistor 113 of the first bus driver 106 exhibits a "0" stuck failure, within the period a of FIG. 9, the n-channel MOS transistor 113 exhibits an off state although the gate potential thereto exhibits a High level (within a period within which the output of the NOR circuit 111 exhibits a High level), and consequently, the output of the first bus driver 106 exhibits a high impedance state and the bus 101 remains holding the potential of "1" (=High level) of the preceding cycle (refer to a broken line portion of the waveform 101 within the period a of FIG. 9). Thus, "1" is outputted from the receiver 109 (refer to a broken line portion of the waveform 109 within the period a of FIG. 9). Then, from the fact that the output value of the receiver 109 is different from an anticipated value, a failure of the bus driver is detected.

In this instance, it is presumed for detection of a "0" stuck failure of the n-channel MOS transistor 113 that the bus 101 keeps the signal level of the preceding cycle.

Therefore, where it is not anticipated to hold a value of the bus 101 such as where the rate (cycle) of the timing signal 108 is very long or where the number of drivers connected to the bus 101 is small or the wiring line length of the bus 101 is short, for example, within the period a of FIG. 9 or the like, the potential of the bus 101 which should exhibit "1" exhibits "0". As a result, a failure of a driver cannot be detected with the pattern described above.

In this manner, with the conventional failure detection system for a bus driver described above, there is a disadvantage that, since it is necessary to cause a gate, which is provided to detect a failure, to be turned on while a bus holds a value of a preceding cycle, where it is not anticipated to hold the value of the bus such as where the rate (cycle) of a timing signal is very long or where the number of drivers connected to the bus is small or the wiring line length of the bus is short, for example, a failure of a bus driver cannot be detected with the pattern described above.

SUMMARY OF THE INVENTION

It is an object of the present invention to provide a bus driver failure detection system which facilitates detection of a failure of a bus driver.

In order to attain the object described above, according to the present invention, there is provided a bus driver failure detection system for a signal transfer circuit, comprising a plurality of bus drivers for sending out signals to a single bus, at least one receiver connected to the bus, and impedance control means for controlling the bus so that, upon testing, the bus does not exhibit a high impedance state.

The impedance control means may include holding means for holding a signal value of the bus, and a switch interposed between the holding means and the bus for exhibiting a conducting state when a test signal is active. In this instance, the holding means may include a pair of inverters each having an input terminal connected to an output terminal of the other of the inverters.

The impedance control means may include a pull-up resistor and a pull-down resistor each having a terminal connected to the bus, and switching control means operable in response to a test signal for connecting the other terminal of the pull-up resistor to a power supply terminal or connecting the other terminal of the pull-down resistor to a ground terminal.

With the bus driver failure detection system, since the impedance control means for controlling the bus so that, upon testing, the bus does not exhibit a high impedance state allows a value of a preceding cycle to be held with certainty by the bus, a failure of a bus driver can be detected with certainty without relying upon the rate (cycle) or the layout of a timing signal, thereby achieving facilitation of a test. Further, reduction of a test pattern (reduction of the length of a test pattern) can be achieved, and consequently, reduction in test time and hence in chip cost can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
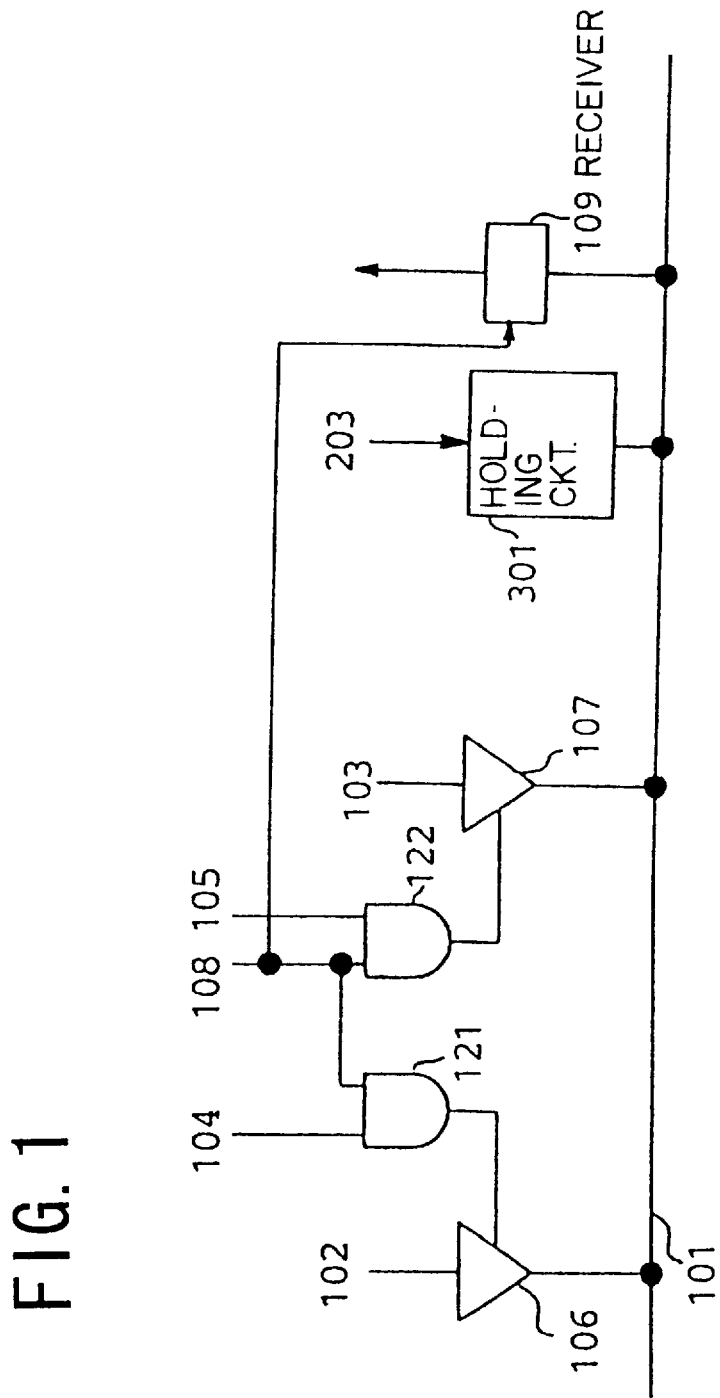
FIG. 1 is a block diagram of a bus driver failure detection system showing a first preferred embodiment of the present invention.
Figure 8:
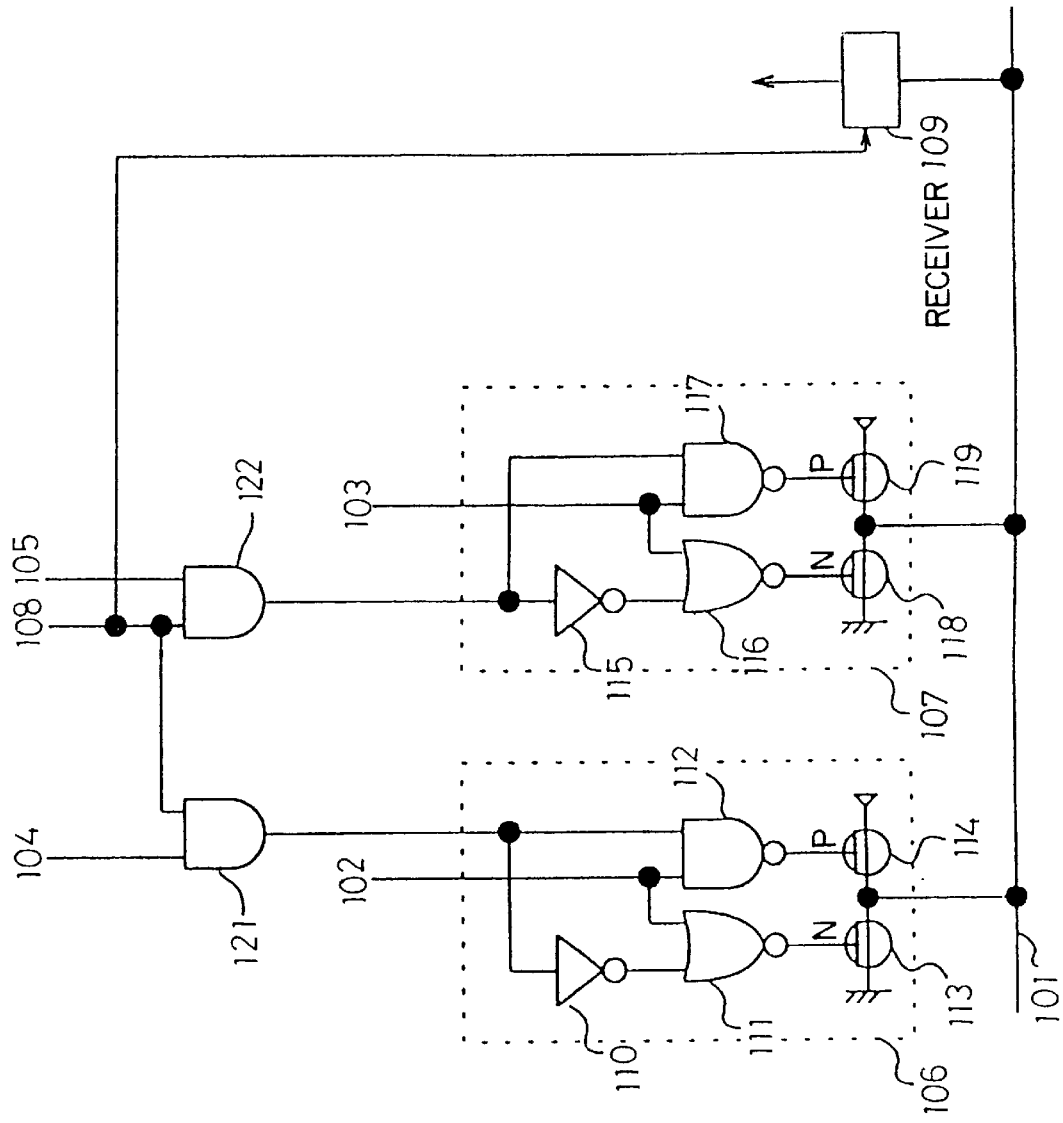
FIG. 8 is a circuit diagram showing a detailed construction of the conventional bus driver failure detection system of FIG. 7.
Figure 9:
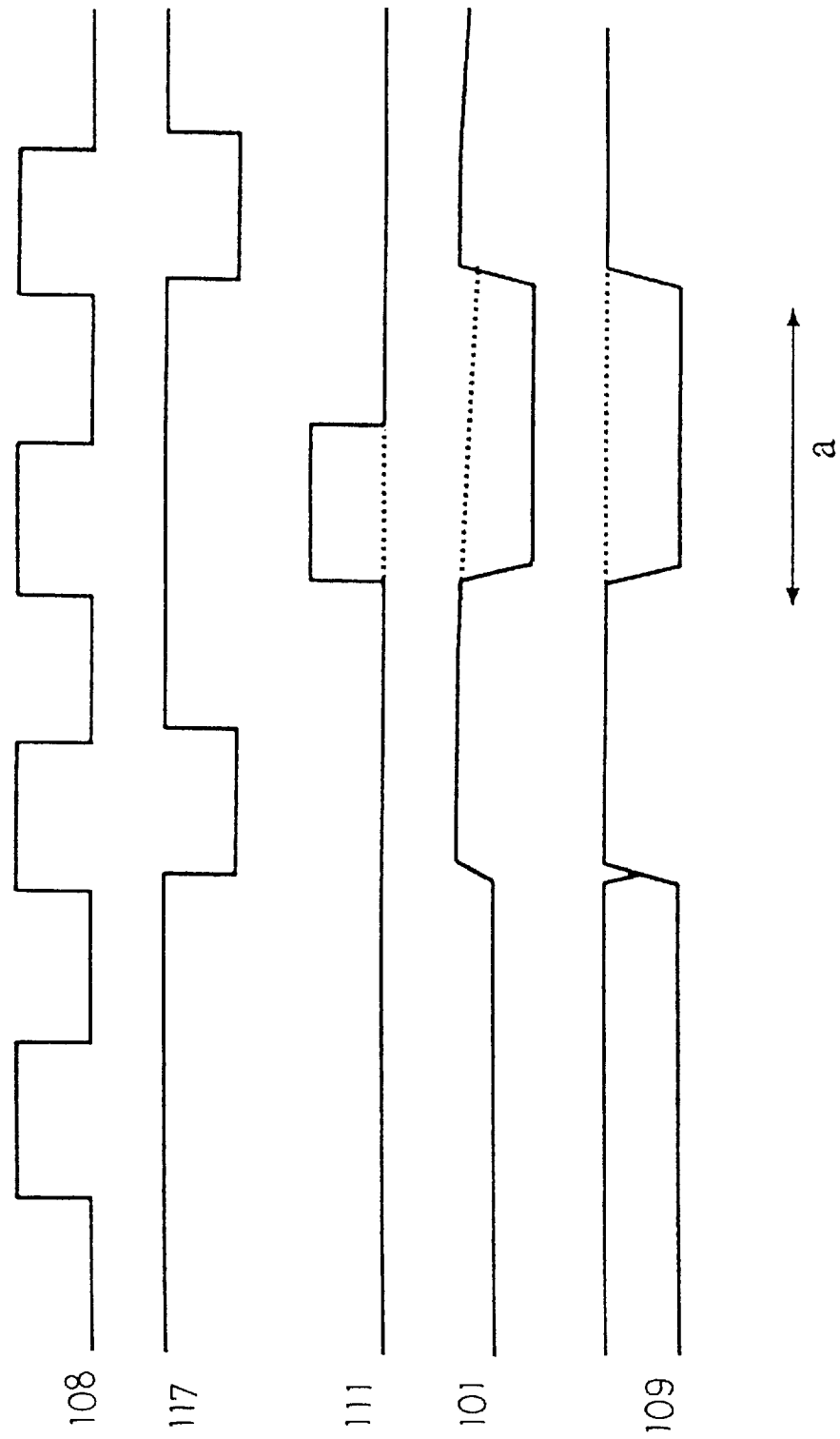
FIG. 9 is a time chart illustrating operation of the conventional bus driver failure detection system of FIGS. 7 and 8.

Referring first to FIG. 1, there is shown a bus driver failure detection system according to a first preferred embodiment of the present invention. The bus driver failure detection system shown is an improvement to the conventional bus driver failure detection system described hereinabove with reference to FIGS. 7 to 9 and includes first and second AND circuits 121 and 122, first and second bus drivers 106 and 107 which output different values to a bus 101, and a receiver 109 for latching a value of the bus 101, similarly to the conventional bus driver failure detection system of FIG. 7. The bus driver failure detection system of the present embodiment is different from the conventional bus driver failure detection system in that it additionally includes a bus holding circuit 301 for holding a value of the bus 101.

The first bus driver 106 outputs, when a first bus driver enable signal 104 is selected, a value of a first output signal 102 to the bus 101 in synchronism with a timing signal 108. Meanwhile, the second bus driver 107 outputs, when a second bus driver enable signal 105 is selected, a value of a second output signal 103 to the bus 101 in synchronism with the timing signal 108. The receiver 109 latches a value of the bus 101 in synchronism with the timing signal 108.

The bus holding circuit 301 holds a value of the bus 101 only when a test signal 203 is active.

Figure 2:
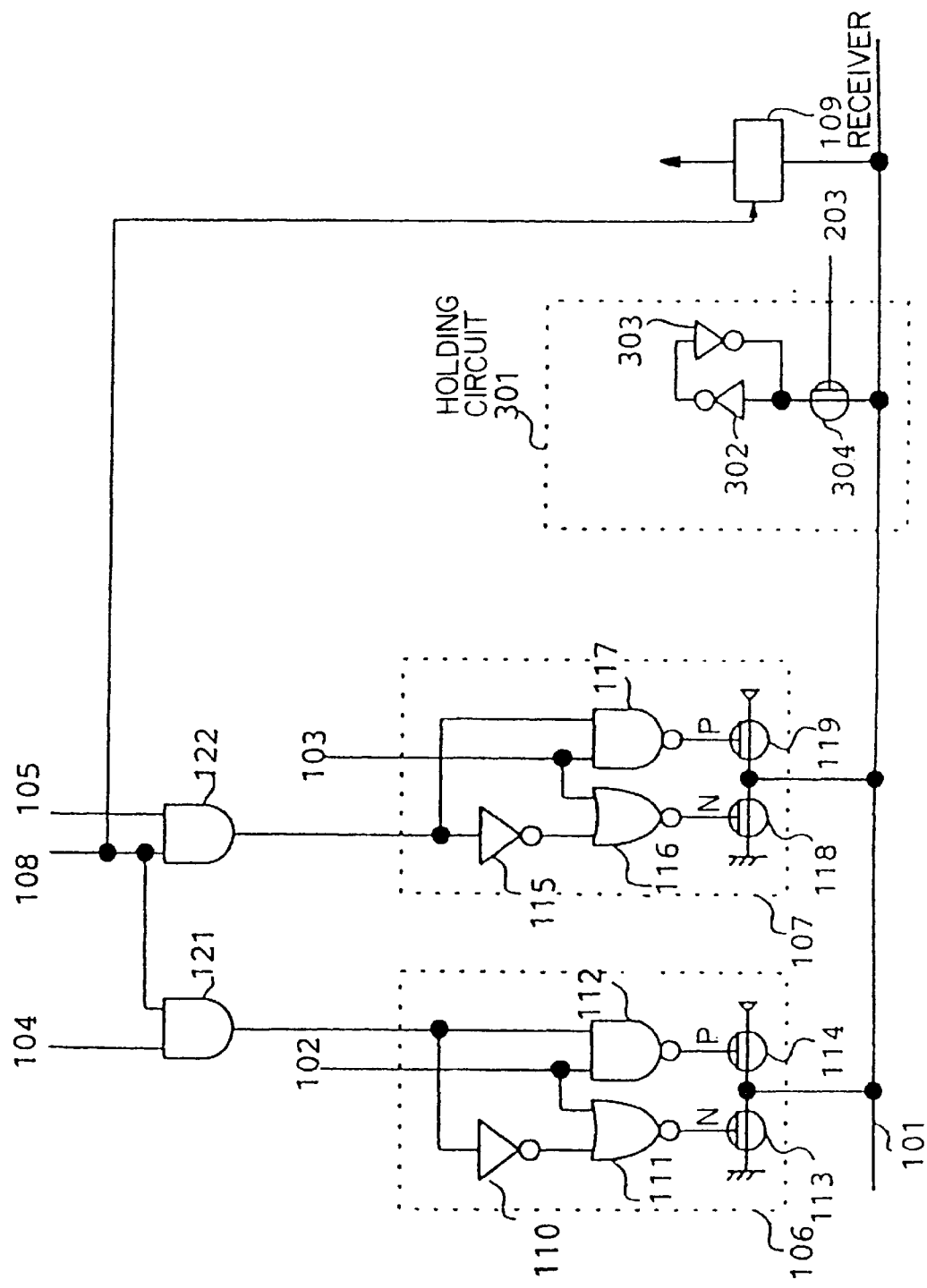
FIG. 2 is a circuit diagram showing a detailed circuit construction of the bus driver failure detection system of FIG. 1.

The bus driver failure detection system of the present invention will be described in more detail below with reference to FIG. 2 and FIG. 3 which shows timing waveforms of several elements of the bus driver failure detection system. FIG. 2 particularly shows a circuit construction of the bus driver failure detection system shown in block diagram in FIG. 1 and shows an example of circuit constructions of the first and second bus drivers 106 and 107 and a circuit construction of the bus holding circuit 301. It is to be noted that the circuit constructions of the first and second bus drivers 106 and 107 are similar to those of the conventional bus driver failure detection system described hereinabove with reference to FIG. 8, and overlapping description of them is omitted here to avoid redundancy. Further, in FIG. 3, a waveform 108 indicates a driver enable signal, another waveform 117 indicates an output of a NAND circuit 117 of the second bus driver 107, a further waveform 111 indicates an output of a NOR circuit 111 of the first bus driver 106, a still further waveform 101 indicates a signal potential of the bus 101, and a yet further waveform 109 indicates an output waveform of the receiver 109.

The bus holding circuit 301 includes a flip-flop formed from a pair of inverters 302 and 303 the input of each of which is connected to the output of the other inverters, and a transfer gate (switch) 304 formed from, for example, an n-channel MOS transistor connected between the output terminal of the inverters 303 (the input terminal of the inverters 302) and the bus 101. The test signal 203 is inputted to the control terminal (gate electrode) of the transfer gate 304.

The dimensions (channel width W and so forth) of the MOS transistor which forms the inverters 303 of the bus holding circuit 301 are smaller than those of the n-channel MOS transistor 113, p-channel MOS transistor 114 and n-channel MOS transistor 118, p-channel MOS transistor 119 which form the first and second bus drivers 106 and 107, respectively, (in other words, the transistor of the inverters 303 has a lower current driving capacity than the output transistors of the drivers) so that, if the output of the inverters 303 and the level of the bus 101 collide with each other, then the level of the n-channel MOS transistor 113 and the p-channel MOS transistor 114 or the n-channel MOS transistor 118 and the p-channel MOS transistor 119 is outputted to the bus 101.

Upon failure detection, the test signal 203 is rendered active to put the switch 304 into an on state to hold a value of the bus 101 then.

Figure 3:
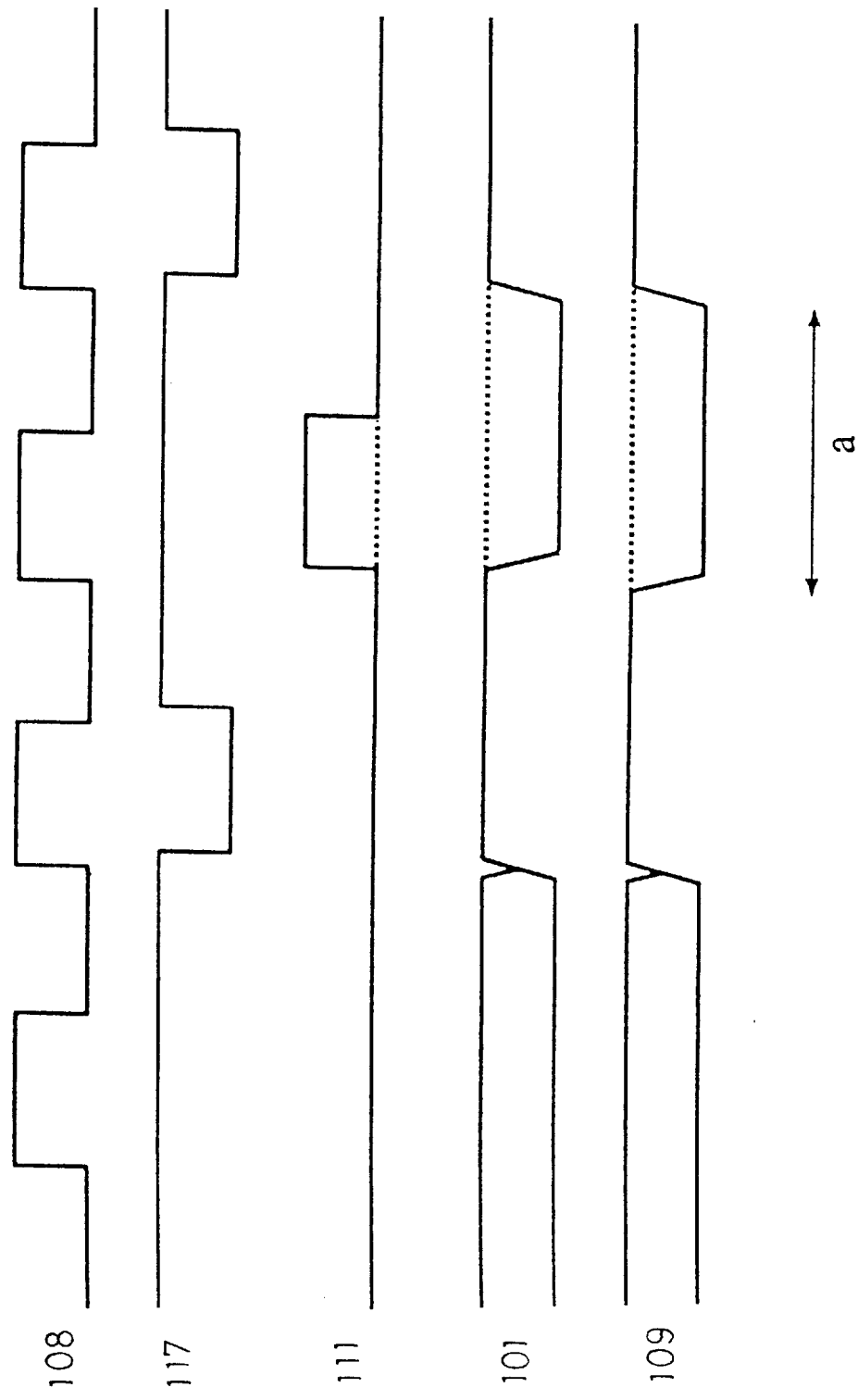
FIG. 3 is a time chart illustrating operation of the bus driver failure detection system of FIGS. 1 and 2.

In order to detect a "0" stuck failure (called "sa0") of the gate input of the n-channel MOS transistor 113 of the first bus driver 106, a pattern wherein the second output signal 103 is set to "1" and the second bus driver enable signal 105 is rendered active so that the p-channel MOS transistor 119 of the output stage of the second bus driver 107 is turned on in synchronism with the timing signal 108 to output "1" to the bus 101, and then the first output signal 102 is set to "0" and the first bus driver enable signal 104 is rendered active so that the n-channel MOS transistor 113 of the first bus driver 106 is turned on in synchronism with the timing signal 108 to output "0" to the bus 101 is produced.

Where this pattern is used, when the n-channel MOS transistor 113 is normal, the bus 101 exhibits "0" within a period a in FIG. 3 (refer to a solid line portion of the waveform 101 of FIG. 3).

On the other hand, if the gate input of the n-channel MOS transistor 113 exhibits a "0" stuck failure, then the n-channel MOS transistor 113 whose gate potential is kept at a High level remains in an off state within the period a of FIG. 3, and the bus 101 remains holding the value "1" of the preceding cycle (refer to a broken line portion of the waveform 101 of FIG. 3). A failure is detected thereby.

In the present embodiment, since the bus 101 holds a value of a preceding cycle with certainty, a failure can be detected without relying upon the rate (cycle) or the layout of the timing signal 108.

Further, since the bus holding circuit 301 is connected to the bus 101 only upon testing, the problem of an increase in electric current arising from collision of the level of the bus 101 does not arise in an ordinary operation of the system other than during testing.

Figure 4:
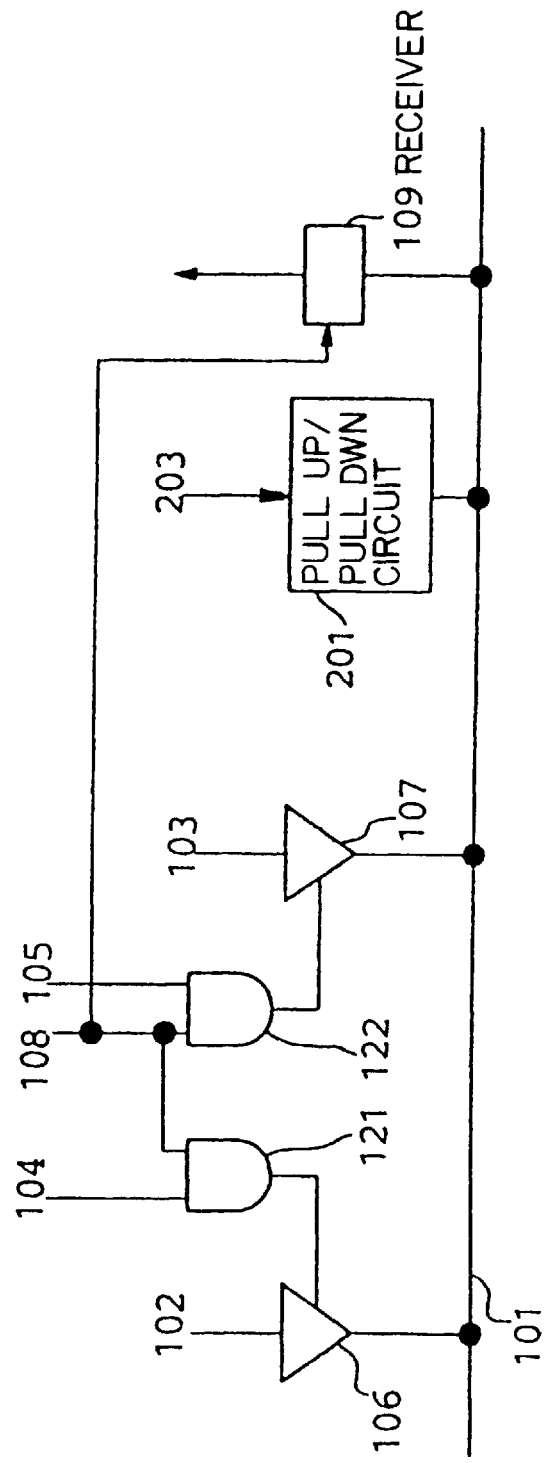
FIG. 4 is a block diagram of another bus driver failure detection system showing a second preferred embodiment of the present invention.

Referring now to FIG. 4, there is shown in block diagram a construction of a bus driver failure detection system according to another preferred embodiment of the present invention. Also the bus driver failure detection system shown is an improvement to the conventional bus driver failure detection system described hereinabove with reference to FIGS. 7 to 9 and includes first and second AND circuits 121 and 122, first and second bus drivers 106 and 107 which output different values to a bus 101, and a receiver 109 for latching a value of the bus 101, similarly to the conventional bus driver failure detection system of FIG. 7. The bus driver failure detection system of the present embodiment is different from the conventional bus driver failure detection system in that it additionally includes a pull-up/pull-down circuit 201 for pulling up/down the bus 101.

The first bus driver 106 outputs, when a first bus driver enable signal 104 is selected, a value of a first output signal 102 to the bus 101 in synchronism with a timing signal 108. The second bus driver 107 outputs, when a second bus driver enable signal 105 is selected, a value of a second output signal 103 to the bus 101 in response to the timing signal 108. The receiver 109 latches a value of the bus 101 in synchronism with the timing signal 108.

The pull-up/pull-down circuit 201 connects a pull-up resistor or a pull-down resistor while a test signal 203 is active.

Figure 5:
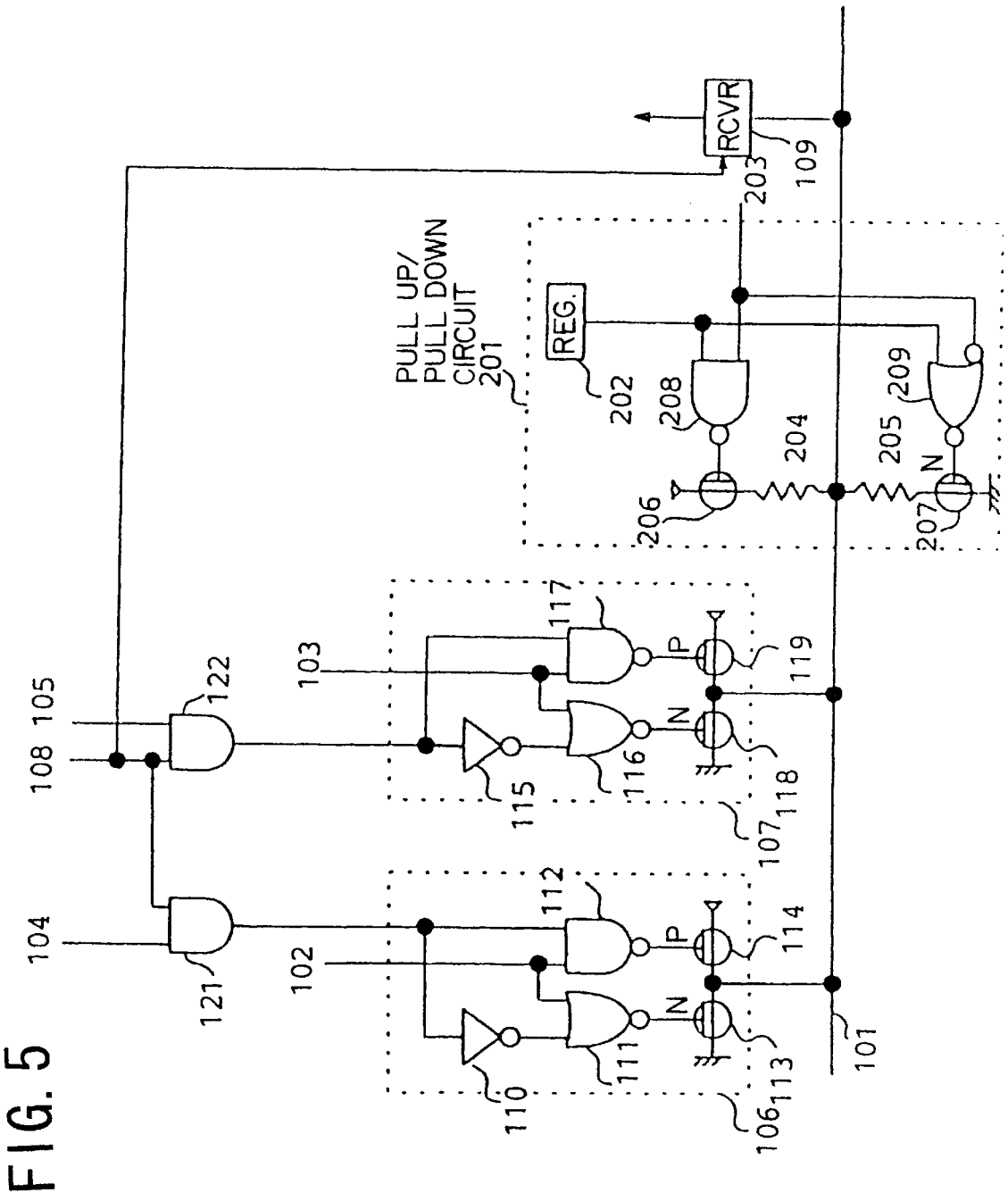
FIG. 5 is a circuit diagram showing a detailed circuit construction of the bus driver failure detection system of FIG. 4.

The bus driver failure detection system of the second embodiment of the present invention will be described below with reference to a circuit diagram of FIG. 5 and a time chart of FIG. 6. FIG. 5 shows an example of a circuit construction of the bus driver failure detection system shown in block diagram in FIG. 4. The first and second bus drivers 106 and 107 have similar circuit constructions to those of the conventional bus driver failure detection system described hereinabove with reference to FIG. 8, and overlapping description of them is omitted herein to avoid redundancy.

The pull-up/pull-down circuit 201 includes a test mode register 202, a NAND circuit 208 to which the test signal 203 and an output of the test mode register 202 are inputted, a NOR circuit 209 to which an inverted signal of the test signal 203 and the output of the test mode register 202 are inputted, a p-channel MOS transistor 206 acting as a switch with the source thereof connected to a power supply, with the gate thereof connected to the output of the NAND circuit 208 and with the drain thereof connected to the bus 101 via a pull-up resistor 204, and an n-channel MOS transistor 207 acting as another switch with the source thereof grounded, with the gate thereof connected to the output of the NOR circuit 209 and with the drain thereof connected to the bus 101 via a pull-down resistor 205.

Upon failure detection, the test signal 203 is rendered active (changed over to a High level) so that one of the switches 206 and 207 is turned on depending upon the value of the test mode register 202.

Consequently, the pull-up resistor 204 or the pull-down resistor 205 is connected to the bus 101.

Figure 6:
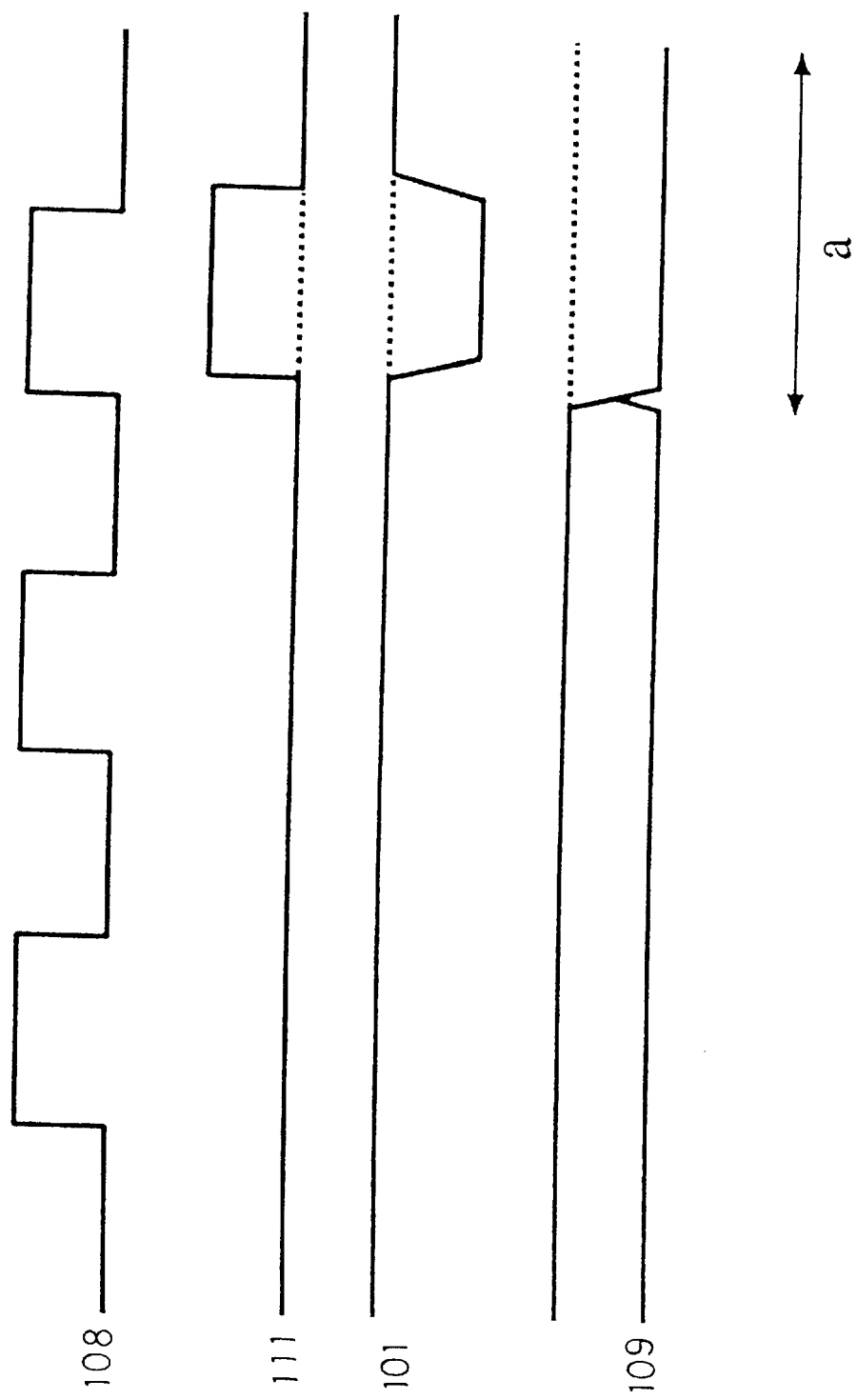
FIG. 6 is a time charge illustrating operation of the bus driver failure detection system of FIGS. 4 and 5.

In order to detect a "0" stuck failure (sa0) of the gate input of the n-channel MOS transistor 113, a pattern wherein the test mode register 202 is set to "1" and the test signal 203 is rendered active to connect the pull-up resistor 204 to the bus 101, and thereafter, the first output signal 102 is set to "0" and the first bus driver enable signal 104 is rendered active so that the n-channel MOS transistor 113 is turned on in synchronism with the timing signal 108 to output "0" to the bus 101 is produced.

Where the pattern just described is used, if the n-channel MOS transistor 113 is normal, then the bus 101 exhibits "0" within a period a of FIG. 6 (refer to a solid line portion of the waveform 101 of FIG. 6, but if the gate input of the n-channel MOS transistor 113 exhibits a "0" stuck failure, then the bus 101 now exhibits "1" due to the presence of the pull-up resistor 204 (refer to a broken line portion of the waveform bus 101 of FIG. 6). A failure is detected thereby.

In the present embodiment, since the pull-up resistor 204 or the pull-down resistor 205 sets the bus 101 to the logic level of "1/0" with certainty, a failure can be detected without relying upon the rate or the layout of the timing signal 108. Further, since the pull-up/pull-down circuit 201 is connected only upon testing, an increase of an electric current which arises from collision of the bus 101 does not occur other than upon testing.

Figure 7:
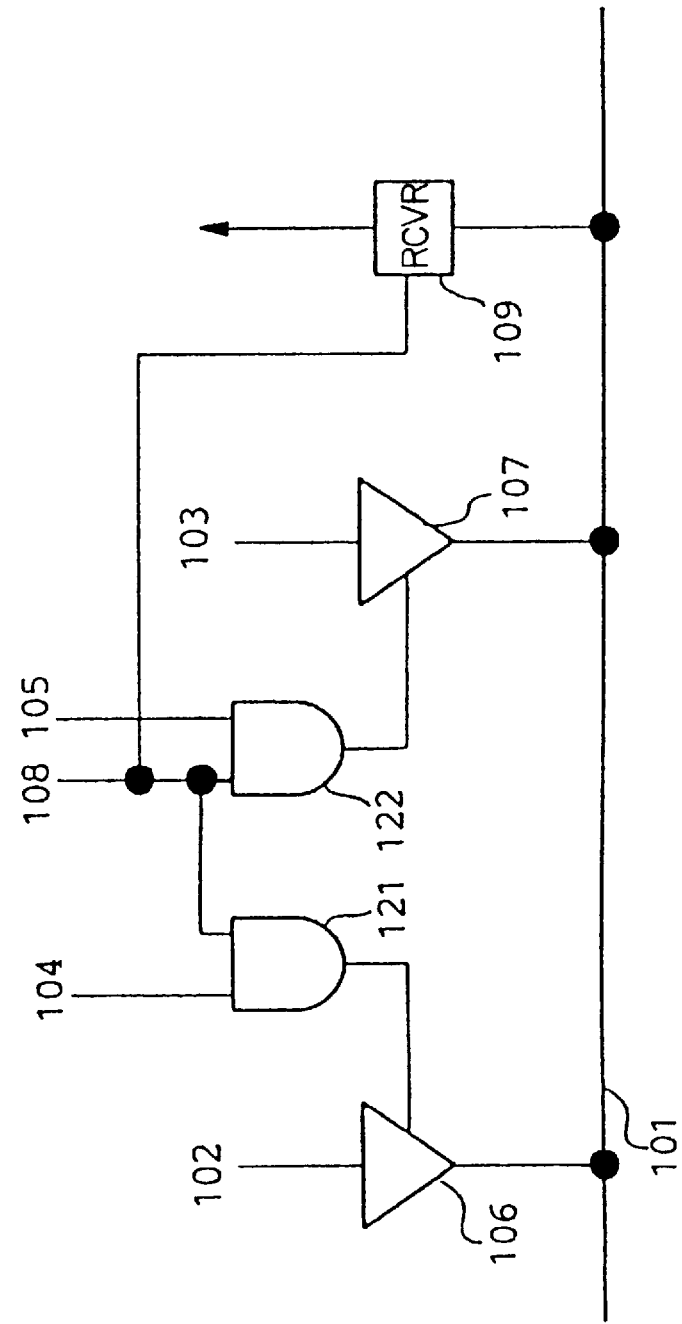
FIG. 7 is a block diagram showing a conventional bus driver failure detection system.

In the conventional bus driver failure detection system shown in FIG. 7 or in the bus driver failure detection system of the first embodiment shown in FIG. 1, where two or more bus drivers for which detection of a failure is performed are involved, in order to detect a failure of the NOR circuit 111 (refer to FIG. 2) which provides an output driver control signal for the first bus driver 106 of FIG. 1, it is necessary to first render the NAND circuit 117 of the second bus driver 107 active and set the bus 101 to a High level and then render the NOR circuit 111 active and place the n-channel MOS transistor 113 into an on state.

Accordingly, in order to detect a failure for a plurality n of p-channel output drivers, it is necessary to drive the bus 101 by 2×n times. However, with the bus driver failure detection system of the second embodiment of the present invention, detection of a failure for a plurality of n of p-channel output drivers can be realized by a single setting operation of pattern data to the test mode register 202 and n driving operations of the bus 101.

Having now fully described the invention, it will be apparent to one of ordinary skill in the art that many changes and modifications can be made thereto without departing from the spirit and scope of the invention as set forth herein.

What is claimed is:

1. A bus driver failure detection system for a signal transfer circuit, comprising:

a plurality of bus drivers for sending out signals to a single bus;

at least one receiver connected to said bus; and holding means for controlling said bus so that, upon testing, said bus holds a signal value thereof.

2. A bus driver failure detection system as claimed in claim 1, further comprising switch means connected between said holding means and said bus for exhibiting a conducting state when a test signal is active.

3. A bus driver failure detection system as claimed in claim 1, wherein said holding means includes a pair of inverters each having an input terminal connected to an output terminal of the other of said inverters.

4. A bus driver failure detection system as claimed in claim 2, wherein said switch means includes a pull-up resistor and a pull-down resistor each having a terminal connected to said bus, said switch means being operable in response to a test signal to connect the other terminal of said pull-up resistor to a power supply terminal or to connect the other terminal of said pull-down resistor to a ground terminal.

5. A bus driver failure detection system as claimed in claim 4, further comprising a register for storing and holding a test signal, and wherein said switch means connects, when the test signal is active, said bus either to said power supply terminal via said pull-up resistor or to said ground terminal via said pull-down resistor in response to a value held in said register.

6. A bus driver failure detection system as claimed in claim 1, wherein each of said bus drivers includes a pair of MOS transistors connected in series between a power supply terminal and a ground terminal, and a gate circuit for producing a control signal, based on an enable signal, for allowing outputting of the driver and an output controlling timing signal, and outputting of the control signal as a gate signal to gate electrodes of said pair of MOS transistors.

* * * * *